(12) United States Patent
Etchessahar et al.

(10) Patent No.: US 12,060,153 B2
(45) Date of Patent: *Aug. 13, 2024

(54) INSERT FOR SUCTION DUCT

(71) Applicant: BOMBARDIER INC., Dorval (CA)

(72) Inventors: Manuel Etchessahar, Montréal (CA);
Eric Hansen, Brampton (CA);
Mohammad Tabesh, Toronto (CA);
Vincent Pointel, Montréal (CA);
Stephen Colavincenzo, Toronto (CA);
Alexis Caron-L'Ecuyer, Lachine (CA)

(73) Assignee: BOMBARDIER INC., Dorval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,732

(22) Filed: Feb. 16, 2023

(65) Prior Publication Data

US 2023/0271708 A1    Aug. 31, 2023

Related U.S. Application Data (63) Continuation of application No. 16/606,543, filed as application No. PCT/IB2018/052466 on Apr. 9, 2018, now Pat. No. 11,608,180.
(Continued)

(51) Int. Cl.
*F24F 13/02* (2006.01)
*B64D 13/06* (2006.01)
(Continued)

(52) U.S. Cl.
CPC .............. *B64D 13/06* (2013.01); *F04F 5/463* (2013.01); *F24F 7/06* (2013.01); *F24F 13/24* (2013.01);
(Continued)

(58) Field of Classification Search
CPC .............. B64D 13/06; B64D 2013/0688; F24F 13/0254; F24F 13/02; F24F 13/026; F24F 2013/0612
(Continued)

(56) References Cited

U.S. PATENT DOCUMENTS

| 4,149,453 A | 4/1979 | Reed |
| 5,230,656 A | 7/1993 | Paterson et al. |

(Continued)

FOREIGN PATENT DOCUMENTS

| DE | 102007061003 A1 * | 6/2009 | ........... B60H 1/3407 |
| DE | 102007061003 A1 | 6/2009 | |

(Continued)

OTHER PUBLICATIONS

PCT International Search Report and Written Opinion dated Jun. 28, 2018 re: International Application No. PCT/IB2018/052466.
(Continued)

*Primary Examiner* — Ko-Wei Lin
(74) *Attorney, Agent, or Firm* — NORTON ROSE FULBRIGHT CANADA LLP (57) ABSTRACT

An insert for an air intake of a suction duct, the insert including an inner portion configured to extend within the suction duct, a mating portion configured for sealingly engaging the air intake, and an outer portion configured for extending outside of the suction duct. The inner portion includes a conduit having a central axis extending along an inlet direction at the inlet end and along an outlet direction at the outlet end, the inlet and outlet directions being non-parallel. The outlet end has a smaller cross-sectional
(Continued)

area than that of the suction duct. The insert includes an inlet in fluid communication with the inlet end of the conduit. The outer portion includes a curved lip surrounding at least part of an inlet opening of the inlet, the lip configured to direct a flow into the inlet opening and toward the inlet end of the conduit.

8 Claims, 11 Drawing Sheets

Related U.S. Application Data

(60) Provisional application No. 62/488,386, filed on Apr. 21, 2017.

(51) Int. Cl.
  *F04F 5/46* (2006.01)
  *F24F 7/06* (2006.01)
  *F24F 13/24* (2006.01)
  *F24F 13/26* (2006.01)
  *F24F 13/06* (2006.01)

(52) U.S. Cl.
  CPC ...... *F24F 13/26* (2013.01); *B64D 2013/0688* (2013.01); *F24F 2013/0612* (2013.01); *F24F 2013/0616* (2013.01)

(58) Field of Classification Search
  USPC ................................................ 454/349, 354
  See application file for complete search history.

(56) References Cited

U.S. PATENT DOCUMENTS

| | | | |
|---|---|---|---|
| 5,256,105 | A | 10/1993 | Austin |
| 5,295,905 | A | 3/1994 | Simble |
| 6,050,527 | A | 4/2000 | Hebert et al. |
| 2010/0029190 | A1 | 2/2010 | Dessero et al. |
| 2016/0194086 | A1 | 7/2016 | Boeing |
| 2018/0155036 | A1 | 6/2018 | Hampe, Jr. |

FOREIGN PATENT DOCUMENTS

| | | |
|---|---|---|
| FR | 2438796 A1 | 5/1980 |
| JP | 201048464 A | 3/2010 |
| KR | 20110050124 A | 5/2011 |
| WO | 2000064602 A1 | 11/2000 |
| WO | 2004033873 A1 | 4/2004 |

OTHER PUBLICATIONS

English translation of French patent document No. FR2438796A1 dated May 9, 1980, https://www32.orbit.com/?locale=en&ticket=01f6b93f-e4c4-4020-96a4-3575f95b3146&embedded=false#PatentDocumentPage, accessed on Sep. 11, 2019.

English translation of Japanese patent document No. JP2010048464A dated Mar. 4, 2010, https://patents.google.com/patent/JP2010048464A/en?oq=JP2010048464A, accessed on Sep. 11, 2019.

English translation of Korean patent document No. KR20110050124 dated May 13, 2011, https://patents.google.com/patent/KR20110050124A/en?oq=KR20110050124A, accessed on Sep. 11, 2019.

\* cited by examiner

FIG. 1 PRIOR ART

FIG_3

FIG_4

INSERT FOR SUCTION DUCT

CROSS-REFERENCE TO RELATED APPLICATIONS

This application is a Continuation of U.S. patent application Ser. No. 16/606,543 filed on Oct. 18, 2019, which is a National Phase Application under 35 U.S.C. 371 of International Patent Application No. PCT/IB2018/052466 filed on Apr. 9, 2018, which claims priority from U.S. Provisional Patent Application Ser. No. 62/488,386 filed on Apr. 21, 2017, the entire content of each of which is incorporated herein by reference.

TECHNICAL FIELD

The application relates generally to air recirculation systems and, more particularly, to suction ducts in such systems.

BACKGROUND OF THE ART

Figure 1:
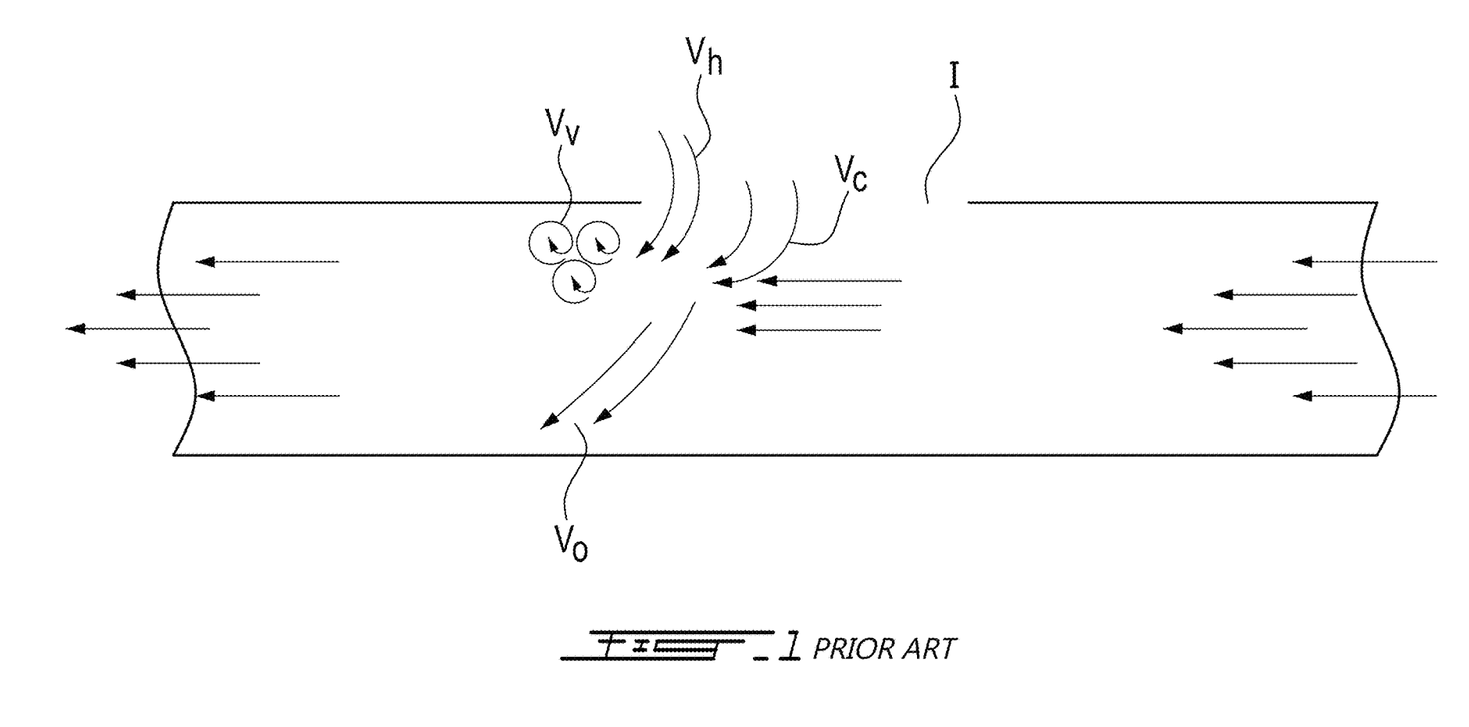
FIG. 1 is a schematic cross-sectional view of a suction duct in accordance with the prior art.

Air recirculation systems, for example in aircraft, include suction ducts used to extract air from the cabin for recirculation. Referring to FIG. 1, such suction ducts typically include air intakes I defined by holes in the duct wall. Suction ducts can represent a significant source of noise, due for example to high air velocity $V_h$ at the intakes I, vorticities $V_v$ in the mix between the sucked flow and the flow circulating through the duct, cross-flow interaction $V_c$ between the sucked flow and the flow circulating through the duct, and/or interaction $V_o$ of the sucked flow with the opposite duct wall. However, possible changes to existing air recirculation systems may be limited by cost considerations, available space and/or certification requirements.

SUMMARY

In one aspect, there is provided an insert for an air intake of a suction duct, the insert comprising: an inner portion configured to extend within the suction duct, the inner portion including a conduit having opposed inlet and outlet ends, the conduit having a central axis extending along an inlet direction at the inlet end and along an outlet direction at the outlet end, the conduit being curved so that the inlet and outlet directions are non-parallel, the outlet end having a smaller cross-sectional area than that of the suction duct; a mating portion configured for sealingly engaging the air intake, the inner portion extending inwardly from the mating portion; and an outer portion configured for extending outside of the suction duct, the outer portion extending outwardly from the mating portion, the insert including an inlet in fluid communication with the inlet end of the conduit, the outer portion including a curved lip surrounding at least part of an inlet opening of the inlet and defining a leading edge of the inlet.

In particular embodiments, the insert may include any one or any combination of the following:

the lip is configured to reduce vorticities in an airflow entering the conduit through the inlet;

the inlet and outlet directions are non-perpendicular;

the outlet end has a jagged trailing edge defined by circumferentially spaced apart notches;

the outlet end has a reduced internal cross-sectional dimension with respect to that of an adjacent portion of the conduit;

the outlet end has an increased external cross-sectional dimension with respect to that of an adjacent portion of the conduit;

the inlet has opposed first and second sides with the first side being closer to the outlet end of the conduit than the second side, the lip forming a protuberance along the first side;

the inlet defines an opening having a greater cross-sectional area than that of the inlet end of the conduit.

In another aspect, there is provided an insert for an air intake of a suction duct, the insert comprising: an inner portion configured to extend within the suction duct, the inner portion including a conduit having opposed inlet and outlet ends, the outlet end having a smaller cross-sectional area than that of the suction duct and having a jagged trailing edge defined by circumferentially spaced apart notches; a mating portion configured for sealingly engaging the air intake, the inner portion extending inwardly from the mating portion; and an outer portion configured for extending outside of the suction duct, the outer portion extending outwardly from the mating portion, the insert including an inlet extending in the outer portion, the inlet in fluid communication with the inlet end of the conduit, the outer portion including a curved lip surrounding at least part of an inlet opening of the inlet and defining a leading edge of the inlet.

In particular embodiments, the insert may include any one or any combination of the following:

the conduit has a central axis extending along an inlet direction at the inlet end and along an outlet direction at the outlet end, the inlet and outlet directions being non-perpendicular;

the inlet has opposed first and second sides with the first side being closer to the outlet end of the conduit than the second side, the lip forming a protuberance along the first side.

In another aspect, there is provided an insert for an air intake of a suction duct, the insert comprising: an inner portion configured to extend within the suction duct, the inner portion including a conduit having opposed inlet and outlet ends, the conduit having a central axis extending along an inlet direction at the inlet end and along an outlet direction at the outlet end, the conduit being curved so that the inlet and outlet directions are non-parallel, the outlet end having a smaller cross-sectional area than that of the suction duct and having a jagged trailing edge defined by circumferentially spaced apart notches; a mating portion configured for sealingly engaging the air intake, the inner portion extending inwardly from the mating portion; and an outer portion configured for extending outside of the suction duct, the outer portion extending outwardly from the mating portion, the insert including an inlet extending in the outer portion and in fluid communication with the inlet end of the conduit.

In a particular embodiment, the inlet and outlet directions are non-perpendicular.

In a particular embodiment, an assembly includes a suction duct and any of the inserts defined above received in an air intake of the suction duct, and the inlet defines part of the mating portion and has an external shape complementary to that of the air intake.

In a particular embodiment, an assembly includes a suction duct and any of the inserts defined above received in an air intake of the suction duct, and the outlet end is aligned with a central axis of the suction duct.

In a further aspect, there is provided a method of reducing noise produced by a suction duct, the method comprising:

directing a first flow into the suction duct around a curved lip and through an inlet toward a conduit extending within the suction duct, the curved lip protruding outwardly from the suction duct; changing a direction of the first flow within the conduit from a first flow direction to a second flow direction; and mixing the first flow exiting from the conduit with a second flow flowing through the suction duct, the second flow flowing along a duct flow direction, the second flow direction being closer to the duct flow direction than the first flow direction.

In particular embodiments, the method may include any one or any combination of the following:

the first flow is directed into the suction duct through an insert in sealing engagement with an air intake of the suction duct, the inlet, curved lip and conduit being defined by the insert;

the first and second flow directions are non-perpendicular;

the first flow direction and the duct flow direction are non-perpendicular;

the second flow direction is aligned with the duct flow direction;

mixing the first flow exiting from the conduit with the second flow flowing through the suction duct includes reducing a coherence of vortices in the mixed flows with a trailing edge of an outlet end of the conduit;

directing the first flow through the inlet and toward the conduit includes constricting the flow.

BRIEF DESCRIPTION OF THE DRAWINGS

For a better understanding of the present invention, as well as other aspects and further features thereof, reference is made to the following description which is to be used in conjunction with the accompanying drawings, where.

In the drawings, embodiments of the invention are illustrated by way of example. It is to be expressly understood that the description and drawings are only for purposes of illustration and as an aid to understanding. They are not intended to be a definition of the limits of the invention.

DETAILED DESCRIPTION

Figure 2:
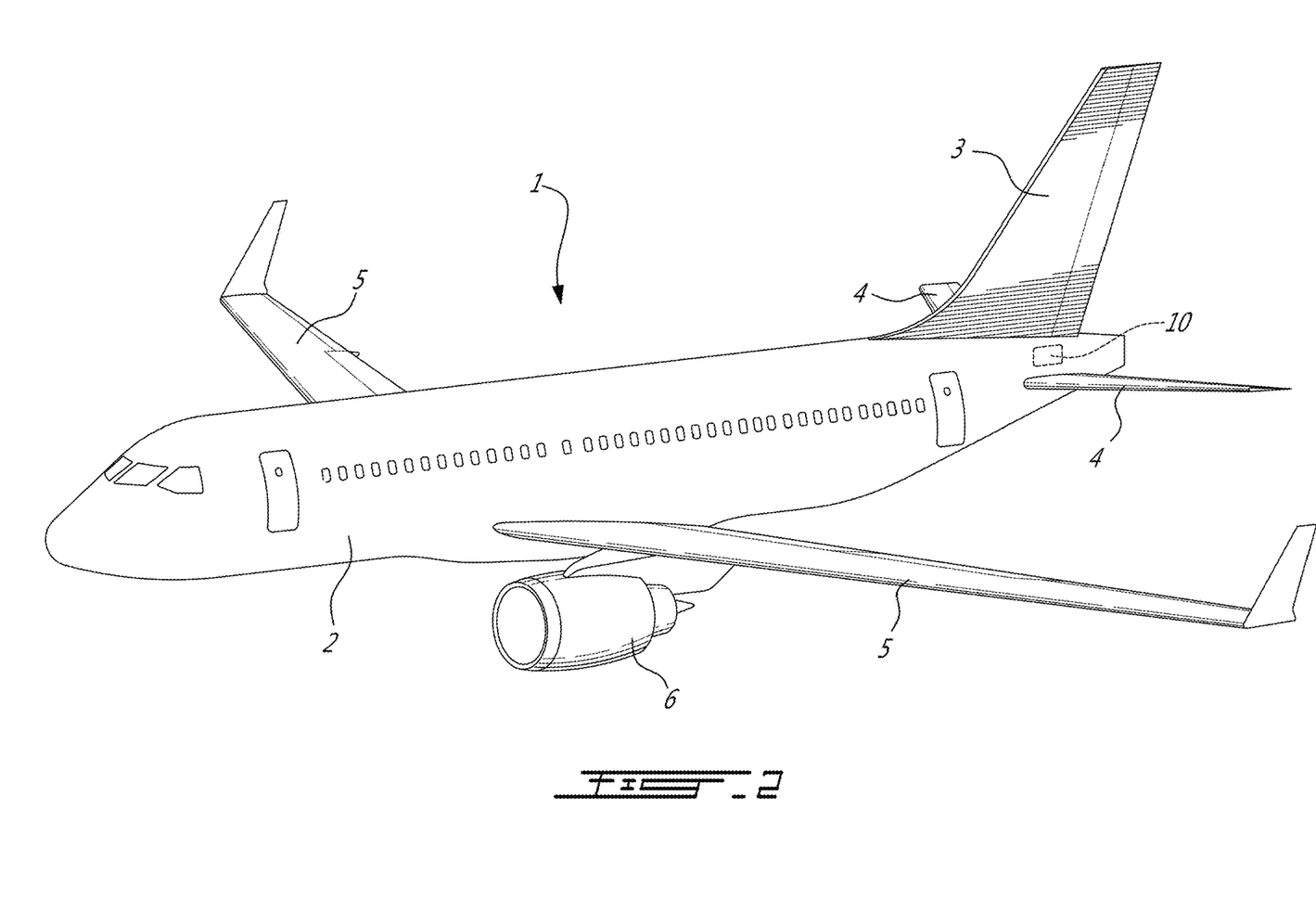
FIG. 2 is a schematic tridimensional view of an aircraft.

Referring to FIG. 2, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

Figure 3:
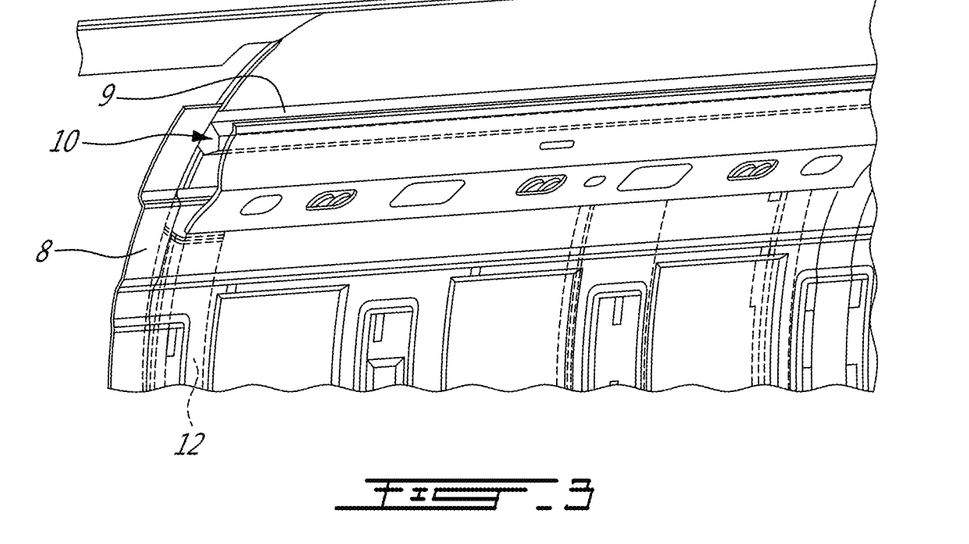
FIG. 3 is a schematic tridimensional view of part of a cabin wall of an aircraft such as that shown in FIG. 2, in accordance with a particular embodiment.
Figure 4:
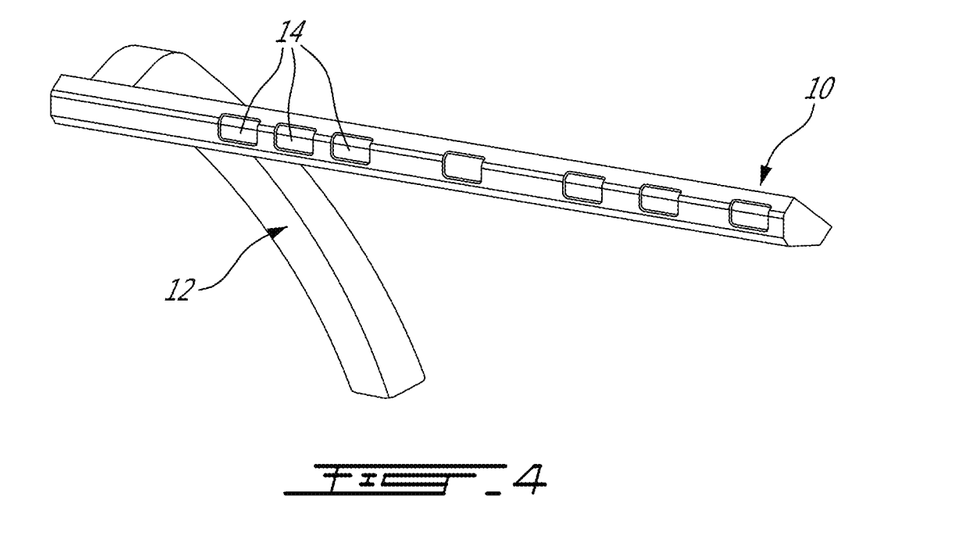
FIG. 4 is a schematic tridimensional view of a suction duct located in the cabin wall of FIG. 3, in accordance with a particular embodiment.

Referring to FIGS. 3-4, the aircraft 1 generally includes air suction ducts 10 which are connected to (e.g., extend within) walls 8 (FIG. 4) of the fuselage 2. In the exemplary embodiment shown, the suction duct 10 extends horizontally within the wall 8 over the aircraft windows, and is connected to a remainder of the air recirculation system (not shown) by a descending duct 12 extending downwardly from the suction duct 10 in fluid communication therewith, curved so as to follow the curved profile of the fuselage wall 8. As can be best seen in FIG. 4, the suction duct 10 includes a plurality of air intakes 14 spaced along a length of the suction duct 10, each intake 14 being defined by a respective opening in the duct wall. Referring back to FIG. 3, the panels of the fuselage wall 8 are configured so as to allow communication of the air intakes 14 with the environment of the cabin, for example by having the air intakes 14 aligned with a gap 9 between superposed panels of the wall 8.

Referring to FIGS. 5*a*-5*d*, an insert 20 in accordance with a particular embodiment is shown. The insert 20 is configured to be received in a corresponding air intake 14 of a suction duct 10 such as shown for example in FIG. 4, and is configured so as to reduce the noise produced by the air flowing into the duct 10, as will be further detailed below.

Figure 5A:
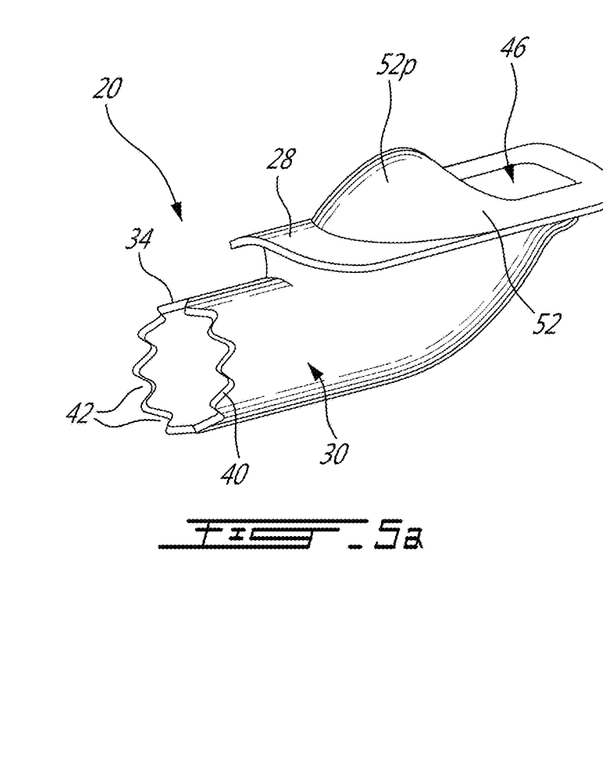
FIG. 5*a* is a schematic tridimensional view of an insert in accordance with a particular embodiment, which may be used in an air intake of the suction duct of FIG. 4.
Figure 5B:
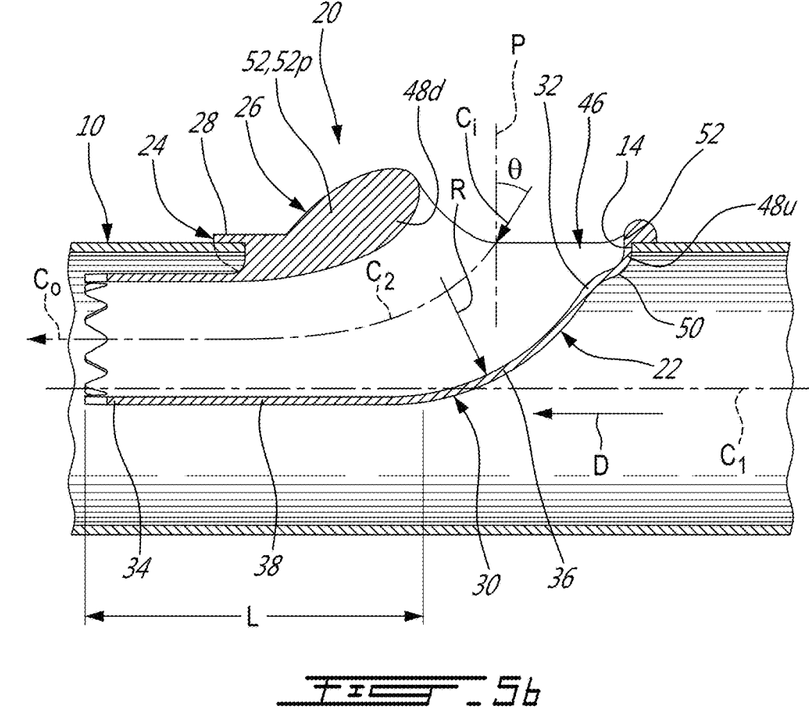
FIG. 5*b* is a schematic side cross-sectional view of the insert of FIG. 5*a*.

As can be best seen in FIG. 5*b*, the insert 20 generally includes an inner portion 22 configured to extend within the duct 10, a mating portion 24 configured for sealingly engaging the air intake 14, and an outer portion 26 configured for extending outside of the duct 10. The inner portion 22 extends inwardly from the mating portion 24, and the outer portion 26 extending outwardly from the mating portion 24.

It is understood that in the present disclosure, including claims, the terms "inward", "inwardly", "outward", "outwardly", and related terms, refer to the relative position with respect to the duct 10, once the insert 20 is installed. For example, an element located "outward" of another element is located further from a central axis $C_1$ of the duct 10.

Still referring to FIG. 5*b*, the mating portion 24 of the insert 20 is configured to attach the insert 20 to the duct 10, and to prevent airflow though the intake 14 around the insert 20. In the embodiment shown, the mating portion 24 includes a flange 28 having a curved profile (see FIG. 5*a*) complementary to that of the outer surface of the duct 10, and dimensioned so as to be larger than the opening defining the intake 14, so as to be abuttable against the outer surface of the duct 10 around the intake 14, and accordingly sealingly engage the intake 14. The flange 28 may be connected to the duct 10 through any suitable method, including, but not limited to, the use of a suitable adhesive such as for example a silicon adhesive. It is understood that any bonding process which is compatible with the materials and surface roughness of the insert 20 and duct 10, and which allows for a junction without leaks to be formed, may alternately be used.

The inner portion 22 of the insert 20 includes a conduit 30 having opposed inlet and outlet ends 32, 34, with the outlet end 34 configured to be located downstream of the inlet end 32 within the duct 10, with respect to a direction D of the flow in the duct 10. The outlet end 34 has a smaller cross-sectional area than that of the duct 10, and is configured to extend within the duct 10 spaced from the duct wall, so that air can flow within the duct 10 around the conduit 30. In the embodiment shown, the conduit 30 has a curved configuration, and is configured to turn the flow toward the direction D of the flow within the duct 10. The central axis $C_2$ of the duct thus extends along an inlet direction $C_i$ at the inlet end 32, and along an outlet direction $C_o$ at the outlet end 34, and the inlet and outlet directions $C_i$, $C_o$ are non-parallel. The outlet direction $C_o$ is closer to the central axis $C_1$ of the duct 10 than the inlet direction C.

In the embodiment shown, the outlet direction $C_o$ is aligned with (e.g., parallel to or substantially parallel to) the central axis $C_1$ of the duct 10, so that the flow exiting the outlet end 34 is directed along the same direction D as the flow within the duct 10. The conduit 30 thus guides and turns the incoming flow so that the flow entering the duct 10 through the insert 20 and the flow already in the duct 10 are parallel, which in a particular embodiment reduces the cross flow interaction.

In the embodiment shown, the inlet and outlet directions $C_i$, $C_o$ are not perpendicular to each other, and accordingly the flow enters the conduit 30 at an angle with respect to a perpendicular P to the central axis $C_1$ of the duct 10; the flow has to turn less than 90 degrees within the conduit 30 to be aligned with the direction D of the flow within the duct 10, which may facilitate turning of the flow.

Figure 5C:
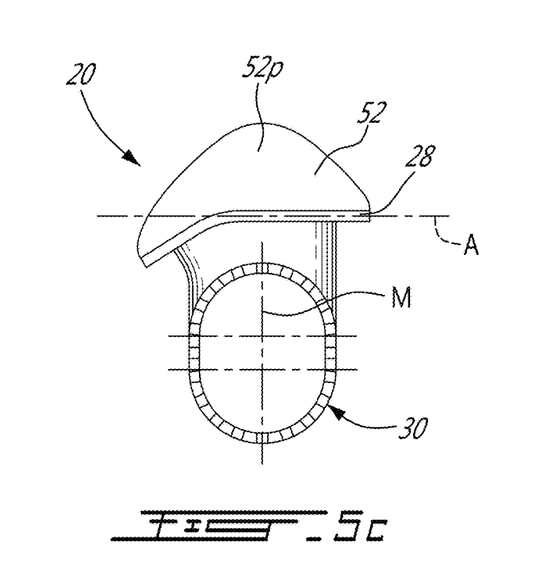
FIG. 5*c* is a schematic front cross-sectional view of the insert of FIG. 5*a*.

As can be best seen in FIG. 5c, in the embodiment shown, the conduit 30 has an oval cross-section, with the major axis M extending perpendicularly with respect to a plane A of the intake 14. Other cross-sectional shapes are alternately possible, examples of which will be provided further below.

In the embodiment shown and referring again to FIG. 5b, the cross-sectional area of the conduit 30 is greater at the inlet end 32 than at the outlet end 34. The curved portion 36 of the conduit 30, which in the embodiment shown includes the inlet end 32, provides for a gradual and smooth transition between the different cross-sectional areas and between the different directions of the inlet and outlet ends 32, 34.

In the embodiment shown, the outlet end 34 and the adjacent portion 38 of the conduit are straight. In a particular embodiment, the length L of this straight portion 38 of the conduit 30 is at least 1.5 times the radius R of the curved portion 36 of the conduit 30. Other relative dimensions are also possible.

In an alternate embodiment which is not shown, for example configured to be used in an end of the duct 10, the conduit 30 is straight. The inlet and outlet directions $C_i$, $C_o$ are coaxial, and in a particular embodiment, aligned with (e.g., parallel to or substantially parallel to) the central axis $C_1$ of the duct 10, so that the flow exiting the outlet end 34 is directed along the same direction D as the flow within the duct 10.

Figure 5D:
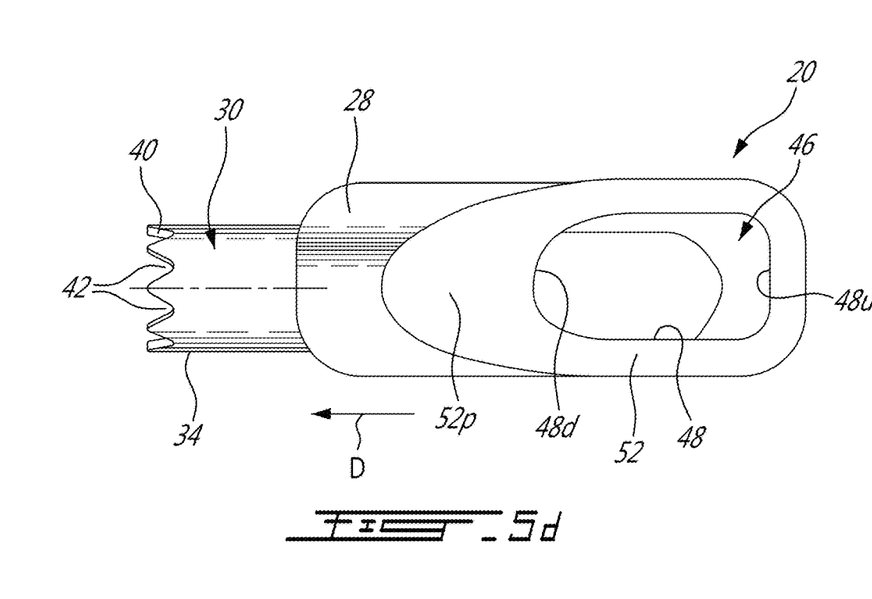
FIG. 5*d* is a schematic top view of the insert of FIG. 5*a*.

In the embodiment shown and referring to FIGS. 5a and 5d, the outlet end 34 of the conduit has similar inner and outer cross-sectional dimensions than the adjacent portion 38 of the conduit 30, but has a jagged trailing edge 40 defined by circumferentially spaced apart notches 42, for example triangular notches (sometimes referred to as chevrons). Alternately, the notches 42 can be omitted; however, in a particular embodiment, the presence of the notches 42 allow for the trailing edge 40 to reduce a coherence of the vortices in the mix between the flow out of the conduit 30 and the flow around the conduit 30, which contributes to the noise reduction obtained with the insert 20. For example, the break in coherence of the flow may prevent the generation of a whistling noise at the outlet end 34 of the conduit 30.

Figure 6A:
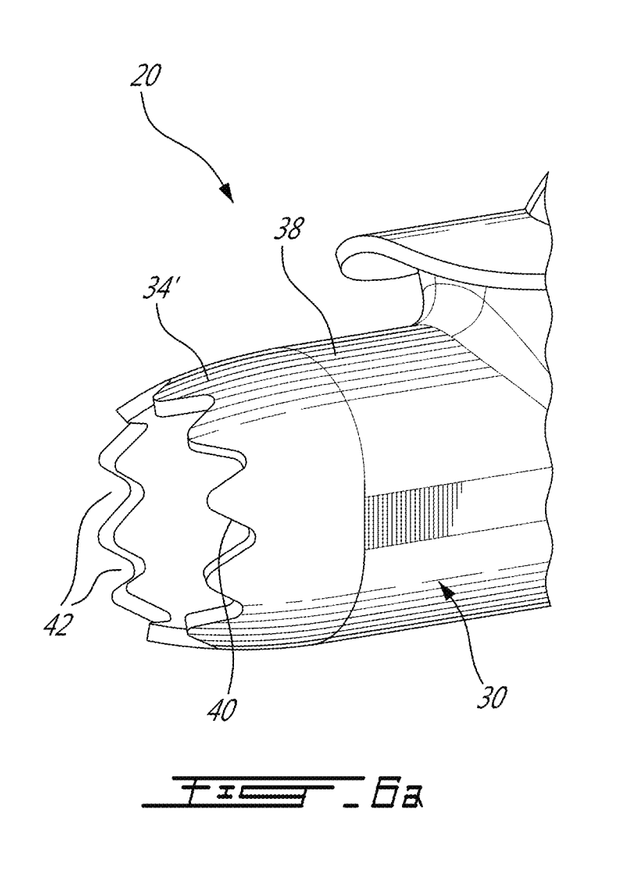
FIGS. 6*a*-6*b* are schematic tridimensional views of an outlet end of an insert such as shown in FIGS. 5*a*-5*d*, in accordance with alternate embodiments.
Figure 6B:
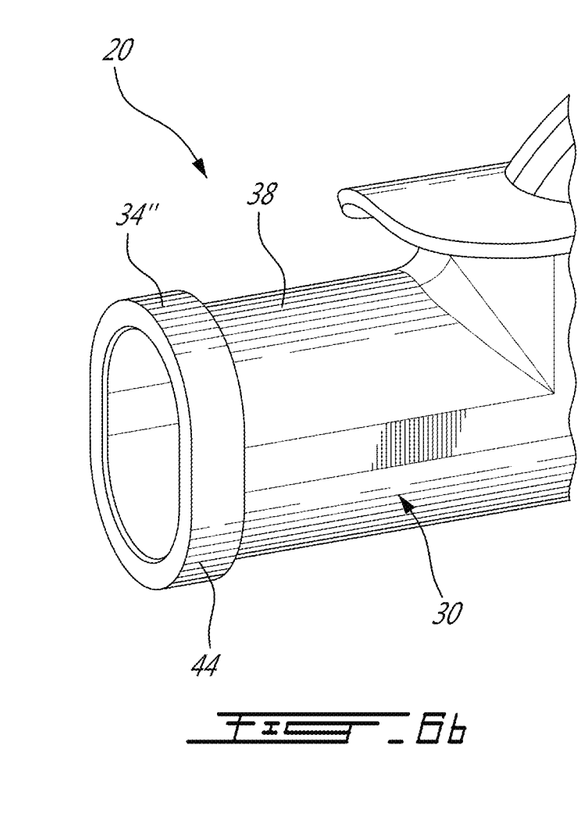

Other configurations for the outlet end 34 may also cause a reduction in the coherence of the vortices of the mixed flow. For example, and as illustrated in FIG. 6a, in another embodiment the outlet end 34' has reduced internal and external cross-sectional dimensions with respect to that of the adjacent portion 38 of the conduit 30, i.e. the outlet end 34' defines a constriction to the flow. The outlet end 34' also includes the jagged trailing edge 40 with notches 42. Another example is shown in FIG. 6b, where the outlet end 34" has an increased external cross-sectional dimension with respect to that of the adjacent portion 38 of the conduit, as defined by a lip 44 surrounding the outlet end 34". Other configurations for the trailing edge of the outlet end may alternately be used, including, but not limited to, a flared configuration (e.g. similar to the bell of a trumpet), the addition of partitions in the outlet end at the trailing edge (e.g. honeycomb or honeycomb-like cells), etc.

Referring back to FIGS. 5a, 5b and 5d, the insert 20 also includes an inlet 46 which extends in the outer portion 26 and accordingly protrudes outwardly of the duct 10. The inlet 46 is in fluid communication with the inlet end 32 of the conduit 30 and with the environment around the duct 10 so as to direct "outside" air (i.e. air from outside of the duct 10) into the conduit 30. Referring to FIG. 5d, the inlet 46 defines an inlet opening 48 which in the embodiment shown has a rectangular shape with rounded corners on its side 48u furthest from the outlet end 34 of the conduit 30 (i.e., on its upstream side with respect to the direction D of the flow within the duct), and a rounded shape on the opposed side 48d (i.e. on its downstream side). It is however understood that the inlet 46 may have any other suitable shape, including, but not limited to, a circular or ovoid shape, and that the configuration shown is exemplary only. The inlet 46 has an external shape complementary to that of the intake opening 14 in the duct 10—in this case, a rectangular shape with rounded corners—so as to extend in close proximity or in engagement with the edge of the intake opening 14 when the flange 28 of the mating portion 24 engages the wall of the duct 10. The inlet 46 accordingly also defines part of the mating portion 24 of the insert 20.

In the embodiment shown and referring to FIG. 5b, the inlet 46 extends inwardly within the duct 10, and accordingly also defines part of the inner portion 22 of the insert 20. The rectangular side 48u of the inlet opening 48 is separated from the inlet end 32 of the conduit 30 by a shoulder 50, while the transition between the rounded side 48d of the inlet opening 48 and the inlet end 32 of the conduit 30 is seamless, i.e. without any visible transition in the internal surfaces. Alternately, and depending on the relative configurations of the inlet opening 48 and conduit 30, the transition may be visible around the entire perimeter of the conduit 30, or seamless around the entire perimeter of the conduit 30.

The outer portion 26 of the insert 20 includes a curved lip 52 defining the leading edge of the inlet 46 and surrounding at least part of the inlet opening 48. The lip 52 protrudes outwardly from the duct 10. The lip 52 is configured to direct the flow toward the inlet end 32 of the conduit 30. In the embodiment shown and as can be best seen in FIG. 5a, the lip 52 extends around the whole perimeter of the inlet opening 48, and allows for sharp edges around the inlet 46 to be avoided, while providing an increased radius for guiding the flow. In a particular embodiment, the smooth, curved lip 52 allows for a reduction or elimination of flow vorticities in the incoming flow.

The lip 52 forms a protuberance 52p on the downstream side 48d of the inlet opening 48. The protuberance 52p extends outwardly further than the remainder of the lip 52, and provides an increased radius for guiding the flow into the insert 20. In the embodiment shown and as can be seen in FIG. 5b, the lip 52 has a teardrop cross-sectional shape at the protuberance 52p, and a semi-circular cross-sectional shape around the remainder of its perimeter. Other configurations are also possible.

In a particular embodiment, the lip 52 is sized to as to balance the need for a guiding radius for the flow, particularly at the downstream side 48d of the inlet opening 48, while allowing for the maximal cross-sectional area for the inlet opening 48 in consideration of the available space within the intake opening 14 of the duct 10. In the embodiment shown, the cross-sectional area of the inlet opening 48 is greater than that of the inlet end 32 of the conduit 30.

Although the insert 20 is shown and described as an element formed separately from the duct 10 and joined thereto, it is understood that in an alternate embodiment, the insert 20 can be an integral part of the duct 10, for example formed therewith in a monolithic manner. The duct 10 can be manufactured so as to include the inner portion 22 extending within the duct 10, outer portion 26 extending outside of the duct 10, and mating portion 24 defined by the walls of the duct 10, in replacement of air intakes defined as simple openings in the duct walls. Accordingly, the term "insert" as used herein is intended to encompass both structures formed separately from and later joined to the duct, and structures formed together with the duct, for example in a monolithic manner.

Figure 7A:
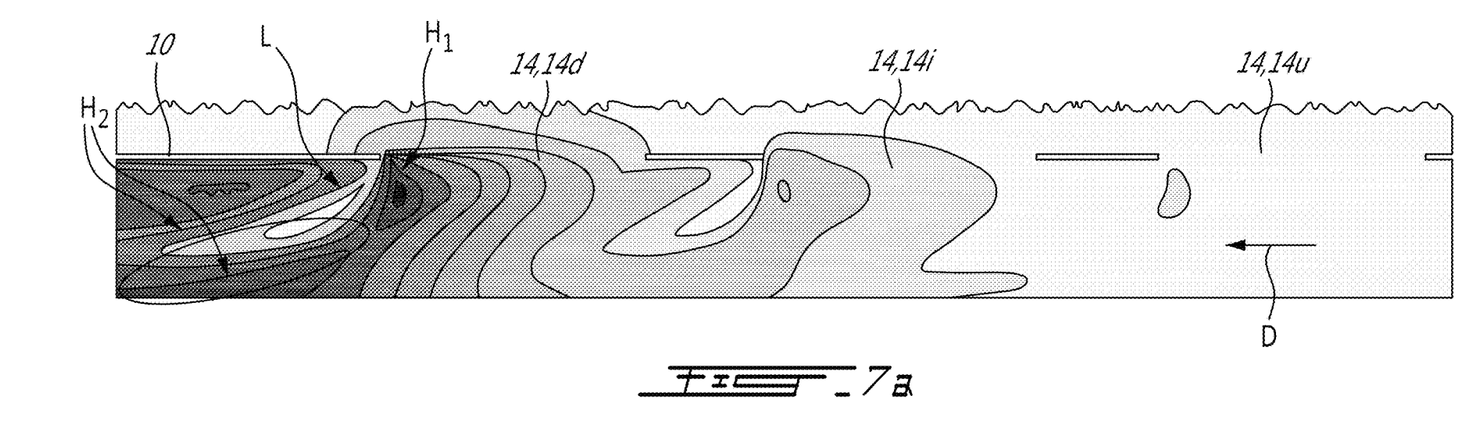
FIG. 7*a* is a graphical representation of flow velocities in an exemplary suction duct without inserts, with the suction duct being shown in cross-section.
Figure 7B:
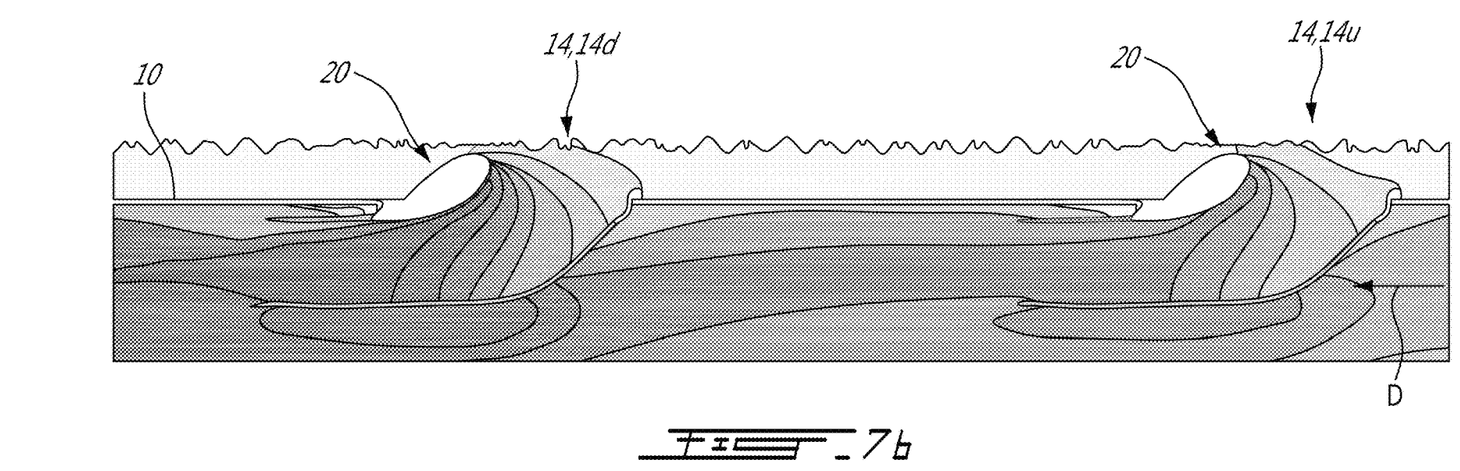
FIG. 7*b* is a graphical representation of flow velocities in the suction duct of FIG. 7*a* but with the addition of inserts such as shown in FIGS. 5*a*-5*d*.

Referring to FIGS. 7a-7b, comparative illustrations of example flow velocity distributions are shown, for a suction duct 10 having intakes without inserts (FIG. 7a) and for the same duct including inserts such as shown in FIGS. 5a-5d (FIG. 7b), for the same air mass flow. In these graphical representations, darker colors correspond to greater flow velocities.

Looking at FIG. 7a, the duct 10 includes an upstream intake 14u, a downstream intake 14d, and an intermediate intake 14i located therebetween, where the characterisation of "downstream" and "upstream" are made with reference to the direction D of the flow within the duct 10. It can be seen that most of the air flow enters the duct 10 through the downstream intake 14d, while minimal air flow enters the duct 10 through the intermediate intake 14i, and negligible air flow enters the duct 10 through the upstream intake 14u. The air flow is accordingly not balanced between the intakes 14. This leads to significant flow velocities at the downstream intake 14d, as illustrated by the zone $H_1$ of high velocity adjacent the downstream edge of the intake 14d. A zone L of very low velocity is defined adjacent this zone $H_1$ of high velocity, illustrating the vorticities in the mix between the flow entering the intake 14d and the flow circulating within the duct 10. Another zone $H_2$ of high velocity is defined adjacent the wall of the duct 10 opposite the intake 14d and extends inwardly in the duct 10, illustrating the cross-flow interaction between the flow entering the intake 14d and the flow circulating within the duct 10 as well as the interaction between the flow entering the intake 14d and the opposite duct wall. These three zones $H_1$, L, $H_2$ represent sources of noise generated at the duct.

By contrast, in FIG. 7b, the intermediate intake is closed (for example, by sealingly engaging a cover to it in the case of a retrofit, or by omitting it in the case of a new design), and an insert 20 is provided in each of the upstream and downstream intakes 14u, 14d. It can be seen that the upstream intake 14u now receives a significant portion of the flow, although the flow velocities are slightly greater at the downstream intake 14d. Also, the flow velocities are distributed similarly in the two intakes 14u, 14d. Comparing with FIG. 7a, it can be seen that the zones $H_1$, L, $H_2$, of high flow velocity adjacent the intake, of low flow velocity illustrating the vorticities, and of high flow velocity adjacent the wall opposite the intake, are no longer present. Accordingly, in a particular embodiment, the use of the inserts 20 reduces or eliminates several sources of noise previously generated by the air entering the duct 10, thus reducing the noise produced at the duct 10.

Moreover, it can be seen that the peak flow velocities are significantly lower and distributed in larger regions of the duct 10, and that the flow is more equally distributed along the duct 10 and between the intakes 14u, 14d. Accordingly, in a particular embodiment, the use of the inserts 20 provides for an improved mass flow balancing along the length of the duct 10. Such may also help in reducing the noise produced at the duct 10.

In a particular embodiment the use of the inserts 20 allows for a reduction of sound power at the source by about 80%, or at least 80% as compared to the same duct 10 without the inserts 20 in the intakes 14, and with the same mass flow; other variations are also possible.

Therefore, in use and in accordance with a particular embodiment, the insert 20 allows for reducing the noise produced at the suction duct 10, by directing a first flow into the duct 10 through insert(s) 20 in sealing engagement with the air intake(s) 14, or insert(s) 20 formed with the suction duct 10 in a monolithic manner. This includes directing the first flow around the curved lip 52 and through the inlet 46 toward the conduit 30 extending within the duct 10, with the curved lip 52 protruding outwardly from the duct 10. As can be best seen in FIG. 5b, this also includes changing the direction of the first flow within the conduit 30 from a first flow direction $C_i$ to a second flow direction $C_o$. The first flow exiting from the conduit 30 is then mixed with a second flow flowing through the duct 10. The second flow flows along a duct flow direction D, and the second flow direction $C_o$ is closer to the duct flow direction than the first flow direction $C_i$, i.e. the insert 20 turns the first flow so that becomes more aligned with the duct flow direction D.

As detailed above, in a particular embodiment the first and second flow directions $C_i$, $C_o$ are non-perpendicular. For example, the second flow direction $C_o$ is aligned with the duct flow direction D, and the first flow direction $C_i$ and the duct flow direction D are non-perpendicular.

In a particular embodiment, mixing the first flow exiting from the conduit 30 with the second flow flowing through the duct 10 includes reducing the coherence of vortices in the mixed flows with the trailing edge 40 of the outlet end 34 of the conduit 30, for example with the jagged trailing edge configuration shown.

In a particular embodiment, the flow is constricted as it is being directed through the inlet 46 and toward the conduit 30.

In the embodiment shown, the insert 20 is mostly contained within the duct 10, and accordingly does not require significant additional space for installation. This may allow for the insert 20 to be easily installed in intakes 14 of ducts 10 of existing installations, as a retrofit to reduce the level of noise produced at the duct 10.

In a particular embodiment, the insert 20 can be added with minimal cost, without changes in the existing structure, and without impeding air recirculation and compliance with certification requirements.

The insert 20 may be made of any suitable material, using any suitable manufacturing method. For example, in a particular embodiment the insert 20 is manufactured from a suitable type of polymer using an additive manufacturing process, and then sanded to reduce surface imperfections and create a smoother surface contacting the flow. Other manufacturing methods and other materials (e.g. composite, metal, rubber, wood, organic materials) are also possible, provided the resulting surface roughness is sufficiently low (i.e. surfaces are sufficiently smooth) to avoid the creation of disturbances in the flow. In a particular embodiment, the insert 20 has a surface roughness of at most 1.5 microns; in a particular embodiment, the insert 20 has a surface roughness of at most 1 micron.

It is understood that the particular configuration (e.g., shape) of the insert 20 shown is exemplary only, and that variations are possible while still allowing for a noise reduction with respect to the same duct used without inserts 20 in the intake openings 14. For example, the optimal shape of the insert 20 may be influenced by mass flow requirements, available space for its installation, the shape and size of the duct 10 and its intake opening 14, etc. FIGS. 8-15 show examples of inserts having different configurations.

Figure 8:
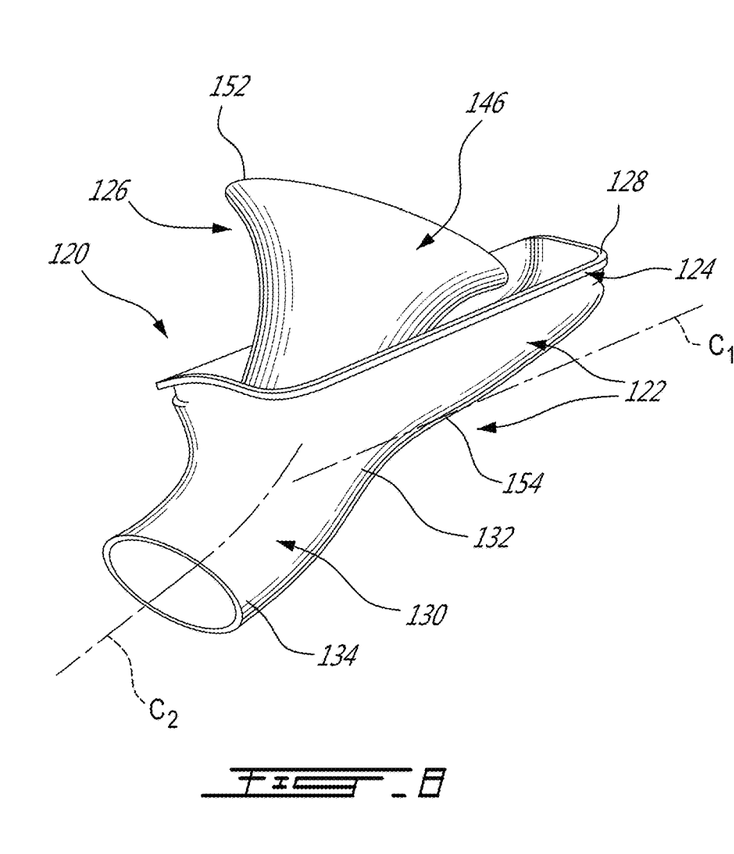
FIGS. 8-15 are schematic tridimensional views of inserts in accordance with alternate embodiments, which may be used in an air intake of the suction duct of FIG. 4.

For example, in the insert 120 shown in FIG. 8, the mating portion 124 and inner portion 122 together defines a bucket having a shape complementary to that of the intake opening, and the mating portion 124 includes a small flange 128 extending around the bucket and configured for engaging the outer surface of the duct around the intake opening. The bucket is closed, i.e. it includes a closed inner wall 154 so that the flow cannot pass therethrough. Through this inner wall 154 protrudes the inlet 146 extending outwardly from the bucket and defining the outer portion 126 of the insert 120. The inlet 146 has an oval cross-section and a flared (trumpet horn) shape having a leading edge formed by a curved lip 152 around its perimeter. The inlet 146 defines a progressively reducing cross-sectional area toward the conduit 130 of the inner portion 122. The conduit 130 is curved and the central axis $C_2$ of the conduit 130 at the outlet end 134 is angled with respect to the central axis $C_1$ of the duct. The conduit 130 has a cross-sectional area progressively reducing from the inlet end 132 to the outlet end 134.

Figure 9:
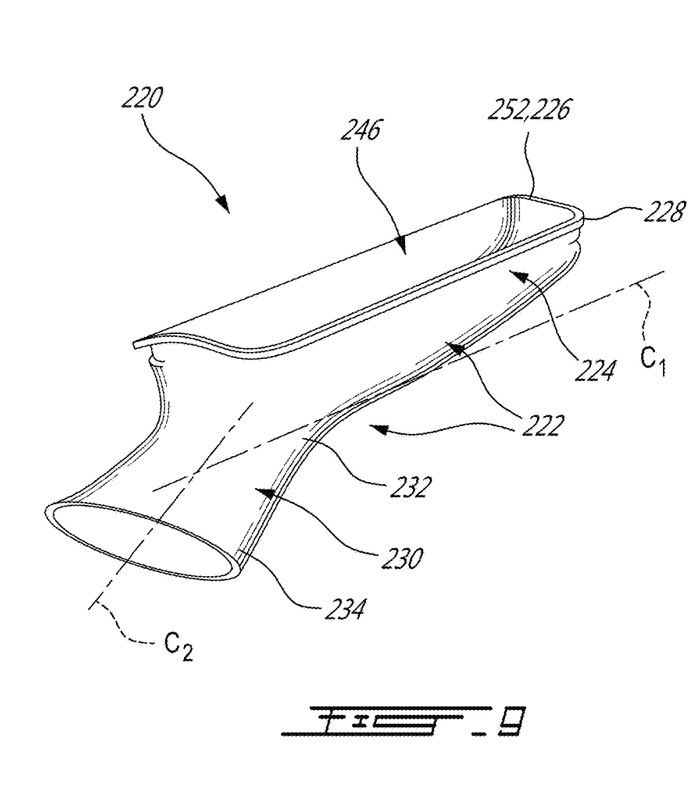

The insert 220 shown in FIG. 9 has a bucket similar to that of FIG. 8, but in this case the bucket defines the inlet 246 and accordingly is open for communication with the inlet end 232 of the conduit 230. The inlet 246 thus has a shape complementary to that of the intake opening and protrudes within the duct, defining part of the mating portion 224 and of the inner portion 222. The mating portion 224 also includes a small flange 228 extending around the inlet 246 and configured for engaging the outer surface of the duct around the intake opening. The inlet 246 defines a rectangular opening and has a leading edge formed by a curved lip 252 around its perimeter, the lip 252 protruding outwardly from the duct to form part of the outer portion 226 of the insert 220. The conduit 230 of the inner portion 222 is straight and the central axis $C_2$ of the conduit 230 is angled with respect to the central axis $C_1$ of the duct. The conduit 230 has a cross-sectional area progressively increasing from the inlet end 232 to the outlet end 234.

Figure 10:
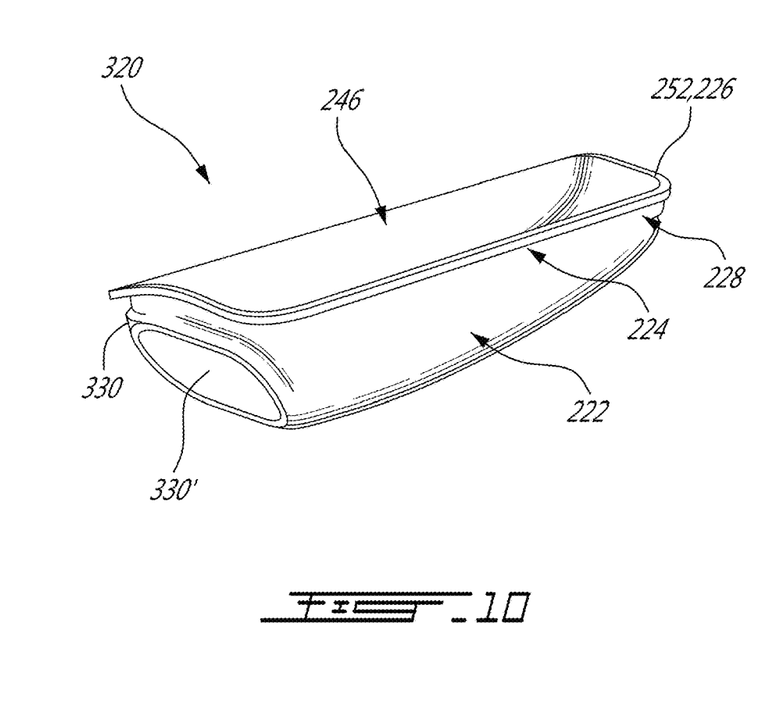

The insert 320 shown in FIG. 10 is similar to the insert 220 shown in FIG. 9, except that the conduit 330 has a minimal length, defined by only a lip surrounding an opening 330' in the inner portion of the inlet 246 and in communication with the duct.

Figure 11:
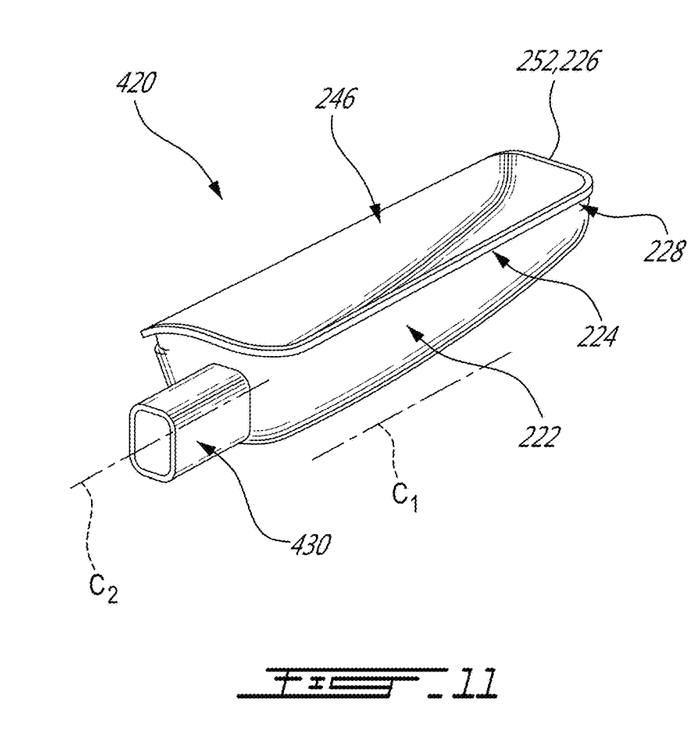

The insert 420 shown in FIG. 11 is also similar to the insert 220 shown in FIG. 9, except that the conduit 430 is straight and has a central axis $C_2$ aligned with the central axis $C_1$ of the duct, and has a rectangular cross-section having a constant cross-sectional area.

Figure 12:
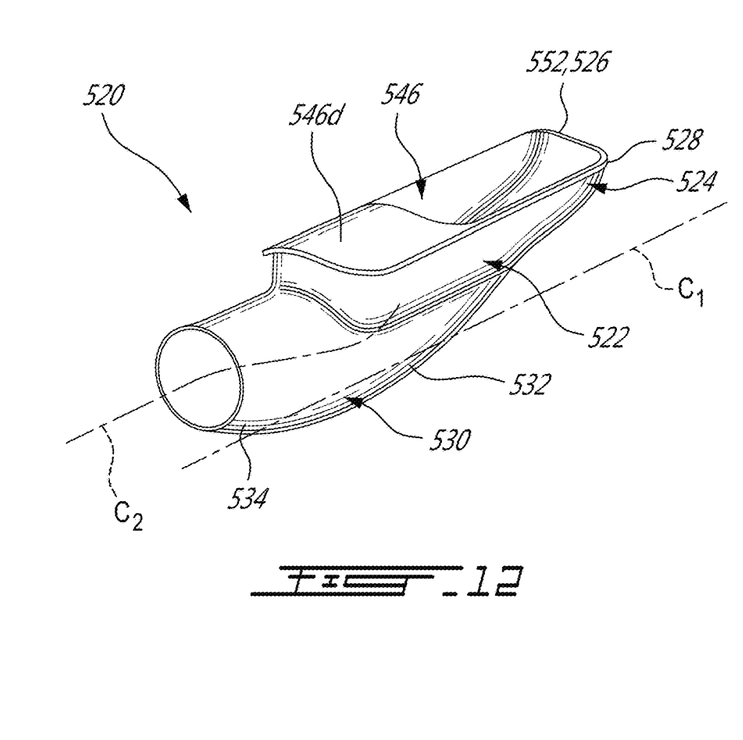

Similarly to the insert 220 of FIG. 9, the insert 520 shown in FIG. 12 includes an inlet 546 having a shape complementary to that of the intake opening and protruding within the duct, defining part of the mating portion 524 and of the inner portion 522, and a flange 528 extending around the inlet 546 and configured for engaging the outer surface of the duct around the intake opening, as part of the mating portion 524. The inlet 546 also defines a rectangular opening having a leading edge formed by a curved lip 552 around its perimeter, the lip 552 protruding from the duct to form part of the outer portion 526 of the insert 520. However, in this case the lip 552 is enlarged at the downstream side 546*d* of the inlet 546, and may for example have a configuration similar to the lip 52 of the insert 20 of FIGS. 5*a*-5*d*. The conduit 530 of the inner portion 522 is curved and the central axis $C_2$ of the conduit 530 at the outlet end 534 is aligned with respect to the central axis $C_1$ of the duct. The conduit 530 has a cross-sectional area progressively increasing and then reducing from the inlet end 532 to the outlet end 534.

Figure 13:
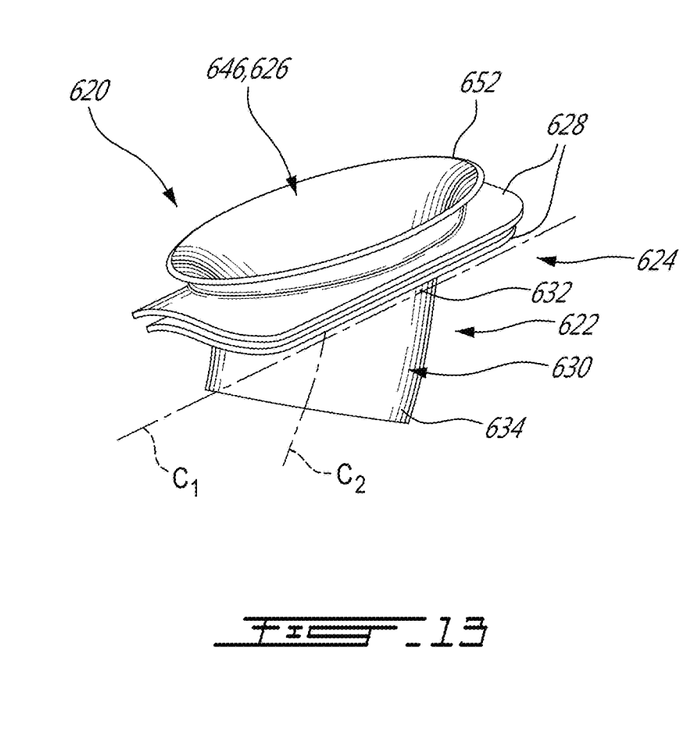

In the insert 620 shown in FIG. 13, the mating portion 624 includes a pair of spaced apart flanges 628, configured for receiving the wall of the duct therebetween around the intake opening. The inlet 646 has an oval cross-section, and extends outwardly of the flanges 628 to define the outer portion 626 of the insert 620. The inlet 646 has a flared (trumpet horn) shape having a leading edge formed by a curved lip 652 around its perimeter, and defining a progressively reducing cross-sectional area toward the conduit 630 of the inner portion 622. The conduit 630 is curved and the central axis $C_2$ of the conduit 630 at the outlet end 634 is angled with respect to the central axis $C_1$ of the duct. The conduit 630 has a cross-sectional area progressively reducing from the inlet end 632 to the outlet end 634, and an oval cross-sectional shape which is "pinched" (i.e., greater ratio of major axis to minor axis) with respect to that of the inlet 646.

Figure 14:
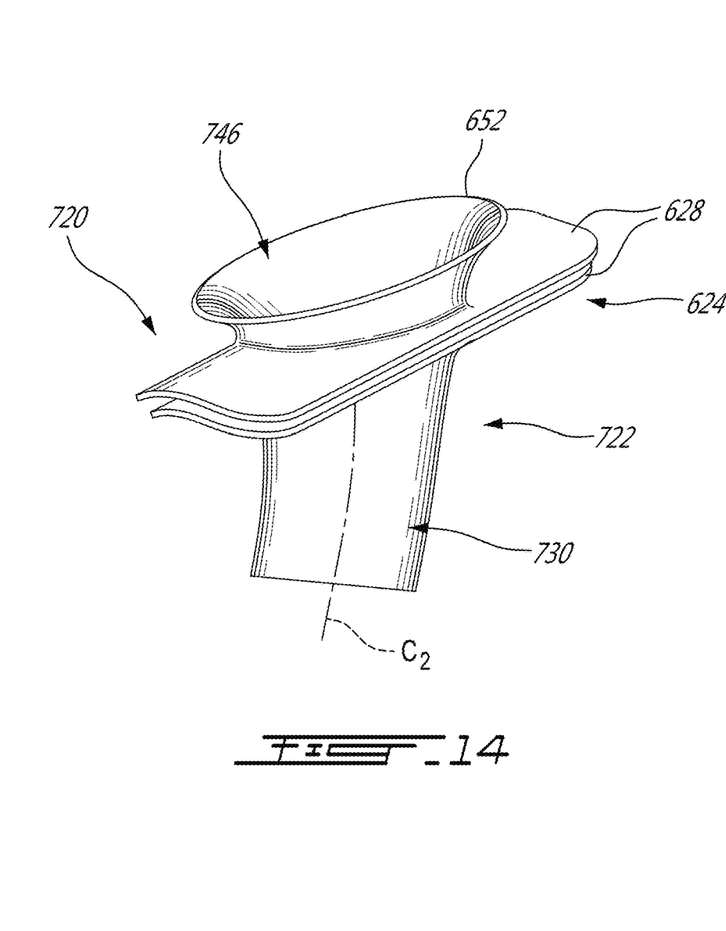

The insert 720 of FIG. 14 is similar to the insert 620 of FIG. 13, but with a longer conduit 730 being defined by the inner portion 722, and with the inlet 746 protruding outwardly from the flanges 628 a greater distance.

Figure 15:
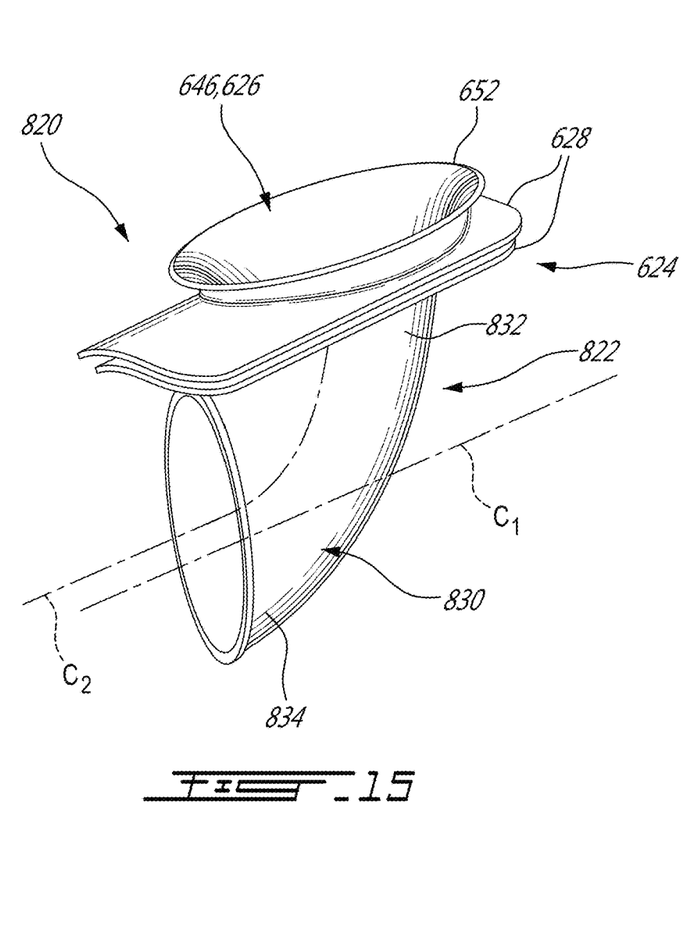

The insert 820 of FIG. 15 is also similar to the insert 620 of FIG. 13, except for the configuration of the conduit 830 of the inner portion 822. The conduit 830 is longer and has a more pronounced curve, with the central axis $C_2$ of the conduit 830 at the outlet end 834 aligned with the central axis $C_1$ of the duct. The conduit 830 has an oval cross-sectional shape and a cross-sectional area progressively increasing from the inlet end 832 to the outlet end 834.

Other variations in shape and configuration of the insert are of course possible. Although not shown, any of the leading edge configurations for the outlet end of the conduit 30 can be applied to any of the inserts shown and described above.

Although described within the context of an aircraft installation, it is understood that the insert 20, 120, 220, 320,

420, 520, 620, 720, 820 can alternately be used in any other suitable type of duct, including, but not limited to, in suction ducts of air recirculation systems of other types of vehicles (e.g., ships, trains) and of air recirculation systems of fixed installations (e.g., buildings).

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. An insert for an air intake of a suction duct, the insert comprising:
    an inner portion configured to extend within the suction duct, the inner portion including a conduit having opposed inlet and outlet ends, the outlet end having a smaller cross-sectional area than that of the suction duct and having a jagged trailing edge defined by circumferentially spaced apart notches;
    a mating portion configured for sealingly engaging the air intake, the inner portion extending inwardly from the mating portion; and
    an outer portion configured for extending outside of the suction duct, the outer portion extending outwardly from the mating portion, the insert including an inlet extending in the outer portion, the inlet in fluid communication with the inlet end of the conduit, the outer portion including a curved lip surrounding at least part of an inlet opening of the inlet and defining a leading edge of the inlet;
    wherein the inlet has opposed upstream and downstream sides with the downstream side being closer to the outlet end of the conduit than the upstream side, the curved lip forming a protuberance along the downstream side, the protuberance extending outwardly further than a remainder of the curved lip.

2. The insert as defined in claim 1, wherein the conduit has a central axis extending along an inlet direction at the inlet end and along an outlet direction at the outlet end, the inlet and outlet directions being non-perpendicular.

3. An assembly including the suction duct and the insert as defined in claim 1 received in the air intake of the suction duct, the inlet defining part of the mating portion and having an external shape complementary to that of the air intake.

4. An assembly including the suction duct and the insert as defined in claim 1 received in the air intake of the suction duct, the outlet end being aligned with a central axis of the suction duct.

5. An insert for an air intake of a suction duct, the insert comprising:
    an inner portion configured to extend within the suction duct, the inner portion including a conduit having opposed inlet and outlet ends, the conduit having a central axis extending along an inlet direction at the inlet end and along an outlet direction at the outlet end, the conduit being curved so that the inlet and outlet directions are non-parallel, the outlet end having a smaller cross-sectional area than that of the suction duct and having a jagged trailing edge defined by circumferentially spaced apart notches;
    a mating portion configured for sealingly engaging the air intake, the inner portion extending inwardly from the mating portion; and
    an outer portion configured for extending outside of the suction duct, the outer portion extending outwardly from the mating portion, the insert including an inlet extending in the outer portion and in fluid communication with the inlet end of the conduit, the outer portion including a curved lip surrounding at least part of an inlet opening of the inlet and defining a leading edge of the inlet;
    wherein the inlet has opposed upstream and downstream sides with the downstream side being closer to the outlet end of the conduit than the upstream side, the curved lip forming a protuberance along the downstream side, the protuberance extending outwardly further than a remainder of the curved lip.

6. The insert as defined in claim 5, wherein the inlet and outlet directions are non-perpendicular.

7. An assembly including the suction duct and the insert as defined in claim 5 received in the air intake of the suction duct, the inlet defining part of the mating portion and having an external shape complementary to that of the air intake.

8. An assembly including the suction duct and the insert as defined in claim 5 received in the air intake of the suction duct, the outlet direction being aligned with a central axis of the suction duct.

* * * * *